United States Patent
Gogna et al.

(10) Patent No.: US 11,736,495 B2
(45) Date of Patent: Aug. 22, 2023

(54) GUIDANCE AUTHENTICATION WITH VEHICLES

(71) Applicant: Zoox, Inc., Foster City, CA (US)

(72) Inventors: Ravi Gogna, San Jose, CA (US); Meredith James Goldman, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/737,530

(22) Filed: May 5, 2022

(65) Prior Publication Data

US 2022/0311780 A1 Sep. 29, 2022

Related U.S. Application Data

(63) Continuation of application No. 16/679,108, filed on Nov. 8, 2019, now Pat. No. 11,349,851.

(51) Int. Cl.
*H04L 9/40* (2022.01)
*G05D 1/00* (2006.01)
(Continued)

(52) U.S. Cl.
CPC ........... *H04L 63/123* (2013.01); *B60W 30/18* (2013.01); *G05D 1/0088* (2013.01); *G05D 1/028* (2013.01);
(Continued)

(58) Field of Classification Search
CPC .. H04L 63/123; H04L 63/0876; B60W 30/18; B60W 2520/10; B60W 2554/00;
(Continued)

(56) References Cited

U.S. PATENT DOCUMENTS

| 5,448,479 A | 9/1995 | Kemner et al. |
| 9,488,979 B1 | 11/2016 | Chambers et al. |
| 2021/0144152 A1 | 5/2021 | Gogna et al. |

FOREIGN PATENT DOCUMENTS

| DE | 102017004882 A1 * | 12/2017 |
| KR | 20190100092 A | 8/2019 |

(Continued)

OTHER PUBLICATIONS

Office Action for U.S. Appl. No. 16/679,108, dated Sep. 17, 2021, Gogna, "Guidance Authentication With Vehicles", 8 Pages.

(Continued)

*Primary Examiner* — Michael J Zanelli
(74) *Attorney, Agent, or Firm* — Lee & Hayes, P.C.

(57) ABSTRACT

Aspects of validating information sent to and/or received by a computing device, such as a vehicle computing device, are discussed herein. A vehicle may receive information associated with a computing device, the information indicating that the computing device is authorized to provide guidance information to an autonomous vehicle. Further, the vehicle can receive a message comprising the guidance information associated with the autonomous vehicle. The vehicle can determine that the message is associated with the computing device and can evaluate the message based at least in part on configuration data associated with maneuvering the autonomous vehicle or state information associated with the autonomous vehicle. The vehicle can be controlled based at least in part on evaluating the message.

20 Claims, 7 Drawing Sheets

(51) Int. Cl.
   *G05D 1/02* (2020.01)
   *B60W 30/18* (2012.01)
(52) U.S. Cl.
   CPC ..... *H04L 63/0876* (2013.01); *B60W 2520/10* (2013.01); *B60W 2540/18* (2013.01); *B60W 2554/00* (2020.02); *G05D 2201/0213* (2013.01)
(58) Field of Classification Search
   CPC ... B60W 60/005; G05D 1/0088; G05D 1/028; G05D 1/0022; G05D 2201/0213; H04W 4/40; H04W 12/069; H04W 12/71
   See application file for complete search history.

(56) References Cited

FOREIGN PATENT DOCUMENTS

| | | |
|---|---|---|
| RU | 2014115621 A | 10/2015 |
| WO | WO2017079460 A2 | 5/2017 |

OTHER PUBLICATIONS

The PCT Search Report and Written Opinion dated Feb. 4, 2021 for PCT application No. PCT/US20/59189, 9 pages.
The International Preliminary Report of Patentability for PCT Application No. PCT/US20/59189, dated May 19, 2022, 8 pages.

\* cited by examiner

GUIDANCE AUTHENTICATION WITH VEHICLES

RELATED APPLICATIONS

This application claims priority to and is a continuation of U.S. patent application Ser. No. 16/679,108, filed on Nov. 8, 2019, the entire contents of which are incorporated herein by reference.

BACKGROUND

Remote controlled devices may receive inputs from a remote system to navigate an environment safely. The inputs may be generated by a teleoperator having authority to control the movement of the devices. However, another entity lacking authority may also send messages to the devices. Occasionally, the teleoperator having the authority may generate a command that provides meaningless instructions to the devices by accidently operating the user input devices such as a keyboard or a touchscreen. Therefore, it is critical for the devices to authenticate and validate the inputs received from the remote system before executing a guidance provided in the inputs.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
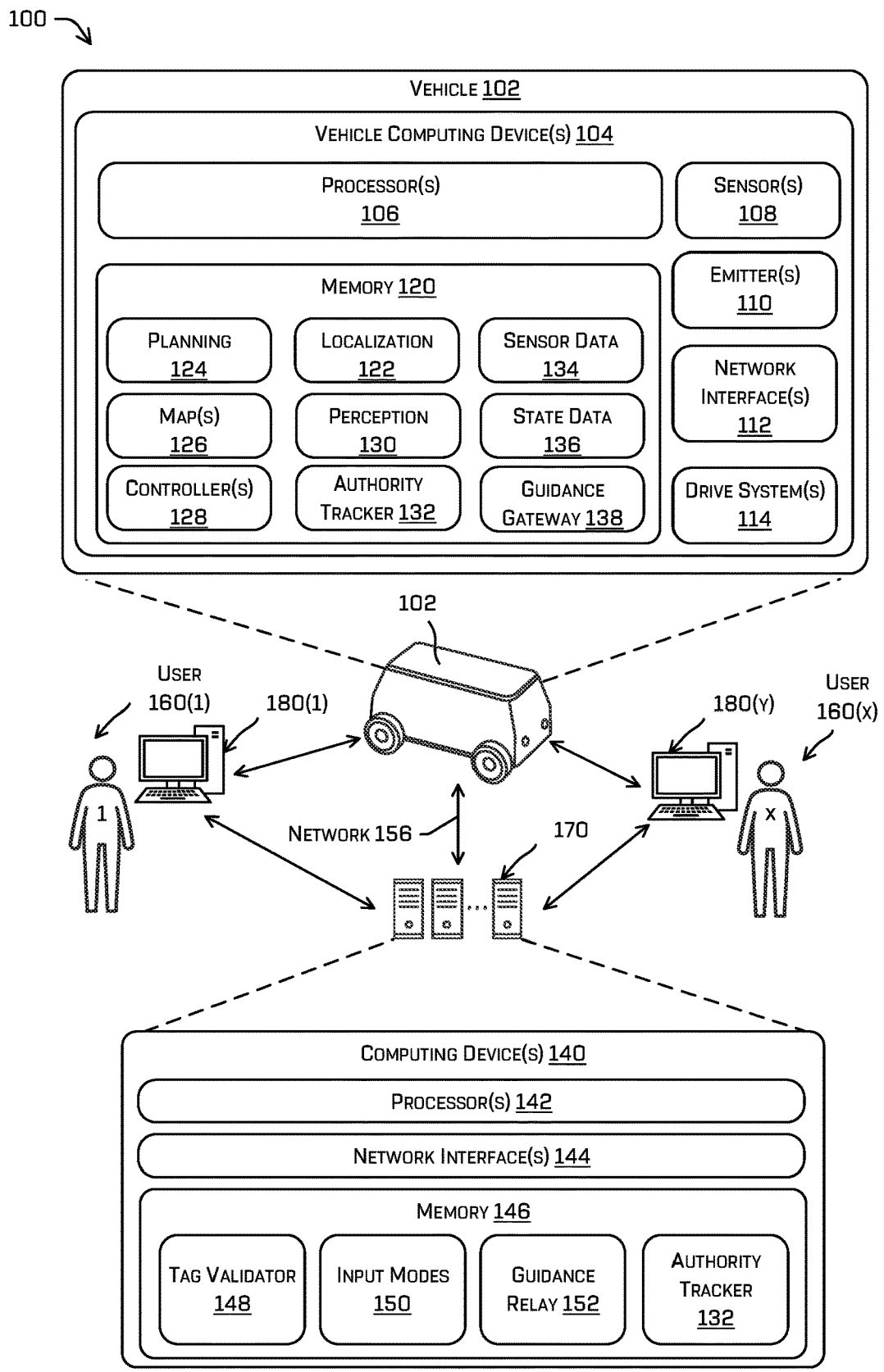
FIG. 1 illustrates an example scenario depicting an autonomous vehicle, a teleoperation system, and example users to provide guidance to the autonomous vehicle, in accordance with examples of the disclosure.

Techniques for authenticating messages to vehicles are discussed herein. In some cases, a teleoperation message may be provided to an autonomous vehicle. Confusion and/or potential safety issues may ensue if such unauthenticated messages (e.g., a valid source of the message is not confirmed) and/or not validated messages (e.g., an expected result of execution of such messages are not confirmed) are executed by an autonomous vehicle. The present disclose provides techniques to authenticate and validate the teleoperation message before it is transmitted to the autonomous vehicle and/or before the guidance is executed by the autonomous vehicle. The methods for authenticating and validating the teleoperation message may be implemented on the computing device of the teleoperation system and/or the computing device of the autonomous vehicle.

In some examples, the computing device of the autonomous vehicle may receive and/or store information associated with a computing device indicating that the computing device is authorized to provide guidance to the autonomous vehicle. One or more teleoperators, or users, may be associated with a teleoperation system. The computing device of the teleoperation system may store information associated with the one or more users and one or more computing devices that can be authorized to provide guidance to the autonomous vehicle. In some circumstances, the autonomous vehicle itself may be authorized to provide guidance. The computing device of the autonomous vehicle may further store message type information indicating a type of message associated with the guidance. The type of message discussed herein may refer to a common topic of the messages, or a channel designated to publish messages in a certain topic. The computing device of the autonomous vehicle may determine that the teleoperation message is associated with the designated channel. The computing device of the autonomous vehicle may subscribe to the designated channel and the teleoperation system may only transmit the teleoperation messages over the designated channel. In some examples, one or more designated type of messages may be used for communication at one time. A mapping or other association between possible messages and the type of the messages may be stored in the memories of the computing device of the autonomous vehicle and the teleoperation system.

In some examples, the computing device of the autonomous vehicle may determine that the teleoperation message is associated with the computing device authorized to provide guidance information. When the teleoperation message is generated, identification information of the user or device generating the message may be automatically attached. The identification information may include a signature of the user and/or IP address of the corresponding device. The identification information may be encrypted using a public key, a private key, a public key/private key pair, a hash code, etc. Upon receiving the teleoperation message, the computing device of the autonomous vehicle may decrypt the identification information and determine that it matches the stored identification information associated with the user and/or the corresponding computing device. When the identification information is determined not to match the stored information, the teleoperation message may be rejected.

In some examples, the computing device of the autonomous vehicle may determine that the message is transmitted over the designated channel. The computing device of the autonomous vehicle may check the mapping between possible messages and the type of the messages. When the message is not transmitted over the designated channel, the computing device of the autonomous vehicle may reject the message.

In some examples, the computing device of the autonomous vehicle may determine that the message complies with configuration data associated with maneuvering the autonomous vehicle. By way of example but not limitation, the configuration data may include speed data of the autonomous vehicle, location data of the autonomous vehicle, size and shape data of a static zone, curvature data between points associated with a trajectory, maximum number of points associated with the trajectory, geofence data (e.g., data indicative of a limited geographic area), etc. In some examples, when the message providing driving speed instructions that are greater than or equal to a maximum speed limit, the computing device of the autonomous vehicle may reject the message. In some other examples, when the message providing curvature between the waypoints in a planned trajectory less than or equal to a curvature threshold, the computing device of the autonomous vehicle may reject the message. In some examples, when the static zone is co-located with a portion of the autonomous vehicle (e.g., a portion of the vehicle is within the static zone or is within a threshold distance of the static zone), the computing device of the autonomous vehicle may reject the message.

In some examples, the computing device of the autonomous vehicle may determine that the message complies with state information associated with the autonomous vehicle. As the autonomous vehicle may operate in various states, for example, a path building state in which the autonomous vehicle awaits information related to a planned trajectory, a static zone state in which the autonomous vehicle awaits information related to a static object in the environment, or a yield reclassification state in which the autonomous vehicle awaits information related to reclassifying an object or an obstacle to determine as to whether to yield to the object or the obstacle, the message may be further checked to ensure that the message provides effective guidance considering the current state of the autonomous vehicle. In some examples, the state information of the autonomous vehicle may comprise at least one of location data, pose data, or velocity data. For example, a message providing one or more points on the trajectory while the autonomous vehicle is in the path building state may be accepted. In other examples, a message providing one or more points on the trajectory while the autonomous vehicle is in the static zone state may be rejected.

FIG. 1 illustrates an example scenario 100 depicting an autonomous vehicle, a teleoperation system, and example users to provide guidance to the autonomous vehicle, in accordance with examples of the disclosure. Through the information sent from the autonomous vehicle 102, user(s) 160(1)-160(x) may monitor the operation of the autonomous vehicle 102, analyze the environment where the autonomous vehicle 102 is located, and provide guidance to the autonomous vehicle 102. Although the users 160(1)-160(x) are depicted as representations of humans, a user 160(x) may comprise a human, an AI component, and/or any other device. Although the discussion herein primarily uses a vehicle or an autonomous vehicle as an example, it is contemplated that the techniques discussed herein may be applied to any other scenario where two or more users are available to supply guidance and/or instructions to a machine and/or where contemporaneous overlapping inputs may cause a degradation of machine operation.

In some examples, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. Moreover, in some examples, the guidance isolation techniques described herein may be usable by non-autonomous vehicles as well.

According to the techniques discussed herein, the autonomous vehicle 102 may receive sensor data 134 from sensor(s) of the autonomous vehicle 102. For example, the sensor data 134 may include a location signal (e.g., a GPS signal or sensor data indicative of a pose of the autonomous vehicle relative to a map), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, and/or bariatric or other environmental signals, etc. The autonomous vehicle 102 may use sensor data 134 received from such sensor(s) 108 to determine a trajectory for controlling motion of the autonomous vehicle 102 and/or a confidence level associated with the trajectory indicating a probability that the autonomous vehicle 102 is operating safely and/or efficiently.

In some examples, based at least in part on determining that a confidence level associated with a trajectory for controlling the autonomous vehicle 102 does not meet a threshold confidence, the autonomous vehicle 102 may generate a teleoperation request. The autonomous vehicle 102 may transmit, via a network 156, the teleoperation request to the teleoperation system 170. This teleoperation request may be an indication that the autonomous vehicle 102 is seeking guidance. The teleoperation system 170 may transmit the teleoperation request to one or more computing devices 180(1)-180(y) associated with the user(s) 160(1)-160(x). The autonomous vehicle 102 may hold until further guidance is received. It should be appreciated that the autonomous vehicle 102 does not necessarily need to seek guidance from the teleoperation system 170 and/or the users 160(1)-160(x). A passenger in the autonomous vehicle 102, a nearby pedestrian, a remote teleoperator, a nearby police car, etc., may provide guidance and/or direct control. Alternatively, or additionally, the teleoperating system 170 may proactively provide guidance to the autonomous vehicle 102.

In some examples, the sensor data 134 may be sent, via the network 156, to the teleoperating system 170 periodically or synchronously. The teleoperating system 170 may display information contained in the sensor data 134 on a user interface of the teleoperating system 170. The teleoperating system 170 may display a video or a dynamic drawing depicting the movement of the autonomous vehicle 102 in the environment. For example, the teleoperating system 170 may display the dynamic driving trajectory of the autonomous vehicle 102, one or more parameters associated with the driving of the autonomous vehicle 102, values associated with the one or more parameters, objects/obstacles detected in the environment, etc. In some examples, the user interface of the teleoperating system 170 may comprise a birds-eye representation of sensor data and/or guidance, a camera feed (e.g., an image, a video), and/or a top-down representation of the sensor data and/or guidance. In some examples, the sensor data may comprise map messages, e.g., map information and annotations to the map, and the sensor data may provide input sufficient to create the shape of a driving boundary or a modified driving boundary. Examples of additional or alternate guidance and/or teleoperations may be found in U.S. patent application Ser. Nos. 15/644,267, 15/644,310, 15/644,349, and 15/644,390 filed Jul. 7, 2017, each of which are incorporated herein in their entirety. The teleoperating system 170 may share the display with one or more computing devices

180(1)-180(y) associated with the user(s) 160(1)-160(x), respectively. While user(s) 160(1)-160(x) may view the information associated with the operation of the autonomous vehicle on their respective computing devices, one user may have authority, i.e., an engaged user, to provide guidance to the autonomous vehicle 102.

The autonomous vehicle 102 may comprise computing device(s) 104 to control the operation of the autonomous vehicle 102. The computing device(s) 104 may include one or more processors 106 and memory 120 communicatively coupled with the one or more processors 106. The one or more processors 106 may be any suitable processor capable of executing instructions to process data and perform operations as described herein. By way of example and not limitation, one or more processors 106 may comprise one or more central processing units (CPUs), graphics processing units (GPUs), integrated circuits (e.g., application-specific integrated circuits (ASIC s), etc.), gate arrays (e.g., field-programmable gate arrays (FPGAs), etc.), and/or any other device or portion of a device that processes electronic data to transform that electronic data into other electronic data that may be stored in registers and/or memory.

The vehicle 102 may include emitter(s) 110 for emitting light and/or sound, as described above. The emitter(s) 110 in this example include interior audio and visual emitter(s) to communicate with passengers of the computing device 104. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 110 in this example also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The computing device 104 may also include network interface(s) 112 that enable communication between the computing device 104 and one or more other local or remote computing device(s). For instance, the network interface (s) 112 may facilitate communication with other local computing device(s) on the computing device 104 and/or the drive system(s) 114. Also, the network interface (s) 112 may allow the vehicle to communicate with other nearby computing device(s) (e.g., other nearby vehicles, traffic signals, etc.). The network interface (s) 112 also enable the autonomous vehicle 102 to communicate with the teleoperation system 170 and/or the computing devices 180(1)-180(y) associated with the users 160(1)-160(x).

The network interface(s) 112 may include physical and/or logical interfaces for connecting the computing device 104 to another computing device or a network, such as network(s) 156. For example, the network interface(s) 112 may enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In some examples, the computing device 104 may include one or more drive systems 114. In some examples, the computing device 104 may have a single drive system 114. In some examples, the drive system(s) 114 may include one or more sensors to detect conditions of the drive system(s) 114 and/or the surroundings of the autonomous vehicle 102. By way of example and not limitation, the sensor(s) of the drive system(s) 114 may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive system(s) 114. In some cases, the sensor(s) on the drive system(s) 114 may overlap or supplement corresponding systems of the computing device 104 (e.g., sensor(s) 108).

The drive system(s) 114 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 114 may include a drive module controller which may receive and preprocess data from the sensor(s) and to control operation of the various vehicle systems. In some examples, the drive module controller may include one or more processors and memory communicatively coupled with the one or more processors. The memory may store one or more modules to perform various functionalities of the drive system(s) 114. Furthermore, the drive system(s) 114 may also include one or more communication connection(s) that enable communication by the respective drive module with one or more other local or remote computing device(s).

In some examples, the memory 120 of the computing device 104 may store component(s) associated with various functions of the autonomous vehicle 102, for example, a localization component 122, a planning component 124, a perception component 130, one or more controller(s) 128, an authority tracker 132, a guidance gateway component 138, and/or similar components that, when executed by the one or more processors 106, may perform various operations to operate the autonomous vehicle 102.

For example, the perception component 130 may include functionality to perform object detection, segmentation, and/or classification. In some examples, the perception component may provide processed sensor data that indicates a presence of an entity that is proximate to the computing device(s) 104 and/or a classification of the entity as an entity type (e.g., car, pedestrian, cyclist, animal, building, tree, road surface, curb, sidewalk, unknown, etc.). In additional and/or alternative instances, the perception component may provide processed sensor data that indicates one or more characteristics associated with a detected entity and/or the environment in which the entity is positioned/oriented. In some examples, characteristics associated with an entity may include, but are not limited to, an x-position/orientation (global position/orientation), a y-position/orientation (global position/orientation), a z-position/orientation (global position/orientation), an orientation, an entity type (e.g., a classification), a velocity of the entity, an extent of the entity (size), sensor signal quality and/or other characteristics, an indication of an amount of features present in a signal, a clarity score associated with a sensor signal, etc. Characteristics associated with the environment may include, but are not limited to, a presence of another entity in the environment, a state of another entity in the environment, a time of day, a day of a week, a season, a weather condition, an indication of darkness/light, etc. In some examples, guidance may specify an output of the perception component (e.g., the classification of an entity, a characteristic of the environment, an event happening in a region in which the autonomous vehicle 102 is located).

In some examples, the localization component 122 may include functionality to receive data from the sensor(s) 108 to determine a map and/or position/orientation of the autonomous vehicle 102. For example, the localization component 122 may include and/or request/receive a map of an environment and may continuously determine a location of the autonomous vehicle 102 within the map. In some examples, the localization component 122 may utilize simultaneous localization and/or mapping (SLAM) and/or calibration, localization and/or mapping simultaneously (CLAMS), to receive image data, LIDAR data, RADAR data, IMU data, GPS data, wheel encoder data, and the like to accurately determine a location of the autonomous vehicle 102. In some examples, the localization component 122 may provide data to various components of the computing device 104 to determine an initial position/orientation of the autonomous vehicle 102 for generating a candidate trajectory, as discussed herein.

The planning component 124 may determine a path for the autonomous vehicle 102 to follow to traverse through an environment. For example, the planning component 124 may determine various routes and trajectories and various levels of detail. For example, the planning component 124 may determine a route to travel from a first location (e.g., a current location) to a second location (e.g., a target location). For the purpose of this discussion, a route may be a sequence of waypoints for travelling between two locations. As non-limiting examples, waypoints include streets, intersections, coordinates (e.g., determined by the localization and/or mapping component and/or a GPS), etc. Further, the planning component 124 may generate an instruction for guiding the autonomous vehicle 102 along at least a portion of the route from the first location to the second location. In some examples, the planning component 124 may determine how to guide the autonomous vehicle 102 from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique. In some examples, and as discussed herein, the planning component 124 may receive a map and/or position/orientation from the localization component and/or various data, such as identifications and/or classifications objects, events, and/or characteristics of the environment from the perception component.

In some examples, one or more of the component(s) may be implemented in whole, or in part, as a neural network. As described herein, an exemplary neural network is a biologically inspired algorithm which passes input data through a series of connected layers to produce an output. Each layer in a neural network may also comprise another neural network or may comprise any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms, instance-based algorithms, Bayesian algorithms, association rule learning algorithms, deep learning algorithms, etc. Additional or alternative examples of neural network architectures may include neural networks such as ResNet50, ResNet101, VGG, DenseNet, PointNet, and the like.

In some examples, the component(s) may process sensor data, as described above, and may send their respective outputs, over the network(s) 156, to the teleoperation system 170 and/or one or more computing device(s) 160(1)-160(x) associated with the users. In some examples, the component(s) may send their respective outputs to the teleoperation system 170 and/or one or more computing device(s) 180(1)-180(y) associated with the users at a particular frequency, after a lapse of a predetermined period of time, in near real-time, etc. In some examples, the computing device 104 may send sensor data to the teleoperation system 170 and/or one or more computing device(s) 160(1)-160(x) associated with the users, via the network(s) 156. In some examples, the vehicle 102 may send raw sensor data to the teleoperation system 170 and/or one or more computing device(s) 160(1)-160(x) associated with the users. In other examples, the computing device 104 may send processed sensor data and/or representations of sensor data to the teleoperation system 170 and/or one or more computing device(s) 160(1)-160(x) associated with the users.

In some examples, the memory 120 may further store one or more controllers 128, which may be configured to control steering, propulsion, braking, safety, emitter(s), communication, and other systems of the autonomous vehicle 102, such as by communicating instructions to the drive system(s) 114 and/or controlling corresponding systems of the drive system(s) 114 and/or other components of the computing device 10.

Memory 120 may be examples of non-transitory computer-readable media. The memory 120 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

The authority tracker 132, when executed by the one or more processors 106 may cause the computing device 104 to perform various actions discussed herein. The authority tracker 132 may store state data 136 in the memory 120 to track a user that currently has authority to provide guidance to the autonomous vehicle 102, i.e., an engaged user. In some examples, the authority tracker 132 may store state data 136 in the memory 120 to record identification information related to the user(s) 160(1)-160(x), e.g., a unique ID of the user in the teleoperation system 170, a unique ID of the user and an IP address of the computing devices 180(1)-180(y) that the user is logged in, an e-signature of the user, an handwritten signature of the user, etc.

In some examples, the authority tracker 132 may determine to transition authority from a first user to a second user. The authority tracker 132 may transmit a state message, via network interface(s) 112 over network(s) 156, to the teleoperation system 170 and/or the computing device(s) 180(1)-180(y) periodically. The state message 244 may include a transition of authority information and/or at least a portion of the state data 136 stored at memory 120. Examples of the teleoperation authority framework may be found in U.S. patent application Ser. No. 16/184,958 filed on Nov. 8, 2018, which is incorporated herein in its entirety.

The guidance gateway component 138, when executed by the one or more processors 106, may cause the computing device 104 to perform various actions discussed herein. The guidance gateway component 138 may access the state data 136 in the memory 120 to determine an engaged user, i.e., a user that currently has authority to provide guidance to the autonomous vehicle 102. The guidance gateway component 138 may receive messages transmitted from the teleoperation system 170 and/or one or more computing device(s) 160(1)-160(x) associated with the users, via the network(s) 156.

In some examples, transmitting messages between the computing device(s) 104 of the autonomous vehicle 102 and the teleoperating system 170 or the computing device(s) 180(1)-180(y) may comprising transmitting (broadcasting) the messages over a designated channel. The designated channel may indicate a type of the messages, a category of the messages or a common topic of the messages. For example, control messages may be transmitted over a control channel, user information may be transmitted over a user information channel, authority messages may be transmitted over an authority chancel, guidance messages may be transmitted over a guidance channel. The computing devices 104 of the autonomous vehicle 102 and the teleoperating system 170 or the computing device(s) 180(1)-180(y) may subscribe to one or more channels but transmit/receive messages over one channel at a time. In some examples, the computing devices 104 of the autonomous vehicle 102 and the teleoperating system 170 or the computing device(s) 180(1)-180(y) may transmit/receive messages over one or more channels.

The guidance gateway component 138 may determine which channel is currently designated to communicate messages between the computing devices 104 of the autonomous vehicle 102 and the teleoperating system 170 or the computing device(s) 180(1)-180(y). For example, the guidance gateway component 138 may determine that only the authority channel is currently designated to communicate messages between the computing devices 104 of the autonomous vehicle 102 and the teleoperating system 170 or the computing device(s) 180(1)-180(y). In some examples, the guidance gateway component 138 may periodically check whether other components of the autonomous vehicle are subscribed to the designated channel. In some other examples, the guidance gateway component 138 may periodically check whether an additional channel is turned on for communicating messages between the computing devices 104 of the autonomous vehicle 102 and the teleoperating system 170 or the computing device(s) 180(1)-180(y). Upon detection of an additional subscriber and/or an additional channel, the guidance gateway component 138 may transmit request messages to the computing devices 104 of the autonomous vehicle, the teleoperating system 170 and/or the computing device(s) 180(1)-180(y) to remove the additional subscriber and/or to turn off the additional channel.

In some examples, upon receiving a message providing a guidance to the autonomous vehicle 102 over the designated channel, the guidance gateway component 138 may determine whether the message is transmitted by an authorized or unauthorized user. The guidance gateway component 138 may decrypt signature information embedded in the message and verify whether the signature matches the user identify information associated with an authorized user. The guidance gateway component 138 may reject the message when the decrypted signature does not match the signature of the authorized user that is stored in the state data 136 in the memory 120. The guidance gateway component 138 may accept the message when the decrypted signature matches the signature of the authorized user that is stored in the state data 136 in the memory 120.

In some examples, the guidance gateway component 138 may further determine whether the message is transmitted over a designated channel for communicating messages between the computing devices 104 of the autonomous vehicle 102 and the teleoperating system 170 or the computing device(s) 180(1)-180(y). The guidance component 138 may accept the message when the message is transmitted over the designated channel. The guidance gateway component 138 may reject the message when the message is transmitted over a channel other than the designated channel. For example, assuming the authority channel is currently designated to transmit/receive messages, when a message related to user information is received, the guidance gateway component 138 may determine whether the user information channel is turned on to transmit messages. The guidance gateway component 138 may reject the user information message if it is determined that the message is transmitted over another channel other than the designated channel, e.g., the user information channel.

The guidance gateway component 138 may subscribe to different channels at different times based at least in part on the state of the autonomous vehicle and/or upon request. By way of example and not limitation, the guidance gateway component 138 may subscribe to the authority channel before the autonomous vehicle 102 starts to navigate. The autonomous vehicle 102 may receive messages transmitted over the authority channel to determine the user currently having authority to provide guidance, i.e., the engaged user. Once the authority information is synchronized between the autonomous vehicle and the teleoperation system 170 and/or the computing device(s) 180(1)-180(y), the guidance gateway component 138 may switch to the guidance channel preparing the autonomous vehicle 102 to receive guidance from the engaged user over the guidance channels. In some examples, authorities may change while the autonomous vehicle is in navigation and the teleoperation system 170 may transmit a request to the autonomous vehicle to listen to the authority channel for updated authority information, causing the guidance gateway component 138 to switch subscription from the guidance channel to the authority channel. The computing device 104 may control the autonomous vehicle 102 to hold until the updated authority information is received. The authority change may include a handing over the authority from a first user to a second user, timing out an engaged user, relinquishing an engaged user, escalating an engaged user to a supervisor user, taking over an engaged user, revoking an engaged user, etc.

It should be appreciated that although the above-noted examples describe one channel, or one topic being used at one time to communicate messages between the autonomous vehicle 102 and the teleoperating system 170, the present disclosure is not intended to be limiting. More than one channel or topic may be used at one time for communications. For example, the authority channel may exist independently from the designated channel. However, the authority message transmitting over the authority channel may deprecate the communications over the designated channel.

In some examples, the computing device 104 may further validate the guidance in the message before executing the guidance based at least in part on pre-set configuration data associated with operation of the autonomous vehicle. By way of example but not limitation, the preset configuration data may include speed data of the autonomous vehicle 102, size and shape data of a static zone, curvature data between points associated with a trajectory, maximum number of points associated with the trajectory, geofence data, etc. In at least one example, when the guidance includes a driving speed that exceeds a pre-set speed limit, the computing device 104 may determine the guidance is not a valid guidance and reject the message. In some examples, when the size of the static zone is above a threshold size (or area), the computing device 104 may determine the guidance is not a valid guidance and reject the message.

In another example, when the guidance includes a curvature value between two points in the trajectory that is beyond a pre-set curvature range, the computing device 104 may determine the guidance is not a valid guidance and reject the message. In another example, when the guidance includes a planned trajectory having a count of points exceeding a pre-set maximum number of points, the computing device 104 may determine the guidance is not a valid guidance and reject the message. In yet another example, when the guidance includes newly added points in the trajectory that are beyond a pre-set distance from the autonomous vehicle, the computing device 104 may determine the guidance is not a valid guidance and reject the message. In yet another example, when the guidance includes newly added points in the trajectory but the initial points in the trajectory are not yet sent, the computing device 104 may determine the guidance is not a valid guidance and reject the message.

In yet another example, when the guidance includes driving through a geographical area where trespassing is prohibited, the computing device 104 may determine the guidance is not a valid guidance and reject the message.

The teleoperation system 170 may include one or more computing devices 140 to analyze data associated with the autonomous vehicle 102 and provide guidance to operate the autonomous vehicle 102, one or more users 160(1)-160(x) that log into one or more computing devices 180(1)-180(y) to monitor the operation of the autonomous vehicle 102 and provide guidance to the autonomous vehicle 102. The computing device(s) 140 may include processor(s) 140 for data processing, network interface(s) 144 to enable communications between the autonomous vehicle 102 and the teleoperation system 170, and a memory 146.

In some examples, the memory 146 of the computing device(s) 140 may store component(s) associated with various functions of the teleoperation system 170, for example, a tag validator 148, an input modes component 150, a guidance relay component 152, an authority tracker 132, and/or similar components that, when executed by the one or more processors 142, may perform various operations to provide guidance to the autonomous vehicle 102.

The tag validator 148 may perform an authority check on a message providing guidance to the autonomous vehicle 102 before it is sent. The message may by generated by at least one of the user(s) 160(1)-160(x) from at least one of the computing device(s) 180(1)-180(y). Although one user, i.e., engaged user, may have authority to provide guidance to the autonomous vehicle 102 at a time, other users, i.e., disengaged users, may log in to their respective computer devices to send messages. The tag herein may refer to an indication associated with a user, for example, a unique ID of the user in the teleoperation system 170, an e-signature of the user, the ID of the user combined with an IP address of the corresponding computing device, a handwritten signature of the user, etc. When a message is generated by the user operating on the corresponding computing device, the indication associated with the user is automatically attached to the message as a tag. The tag may be in the original format of the indication associated with the user, e.g., original handwritten signature. Additionally, or alternatively, the tag may be processed information of the indication associated with the user, e.g., encrypted e-signature, encrypted IP address, etc. The tag validator 148 may obtain authority data from the authority tracker 132 for tag validation. When the tag validator 148 determines that the tag attached to a newly generated message does not match the authority data, the tag validator 148 may transmit the determination to the guidance relay component 152 to discard the message. It should be appreciated that the tag validator 148 and the authority tracker 132 shown in FIG. 1 and FIG. 2 and discussed herein are merely for the purpose of illustration. The operations of the tag validator 148 and the authority tracker 132 may be integrated into one component. For example, the operations of the tag validator 148 may be incorporated into the authority tracker 132. Alternatively, the operations of the authority tracker 132 may be incorporated into the tag validator 148. Additionally, or alternatively, the operations of the tag validator 148 and the authority tracker 132 may be incorporated into other components of the autonomous vehicle 102. The present disclosure is not intended to be limiting.

The input modes component 150 may store a current input mode associated with operating the autonomous vehicle 102. The computing device(s) 140 of the teleoperation system 170 may determine whether the guidance provided by the message complies with the current input mode. When the guidance provided by the message does not comply with the current input mode, the guidance relay component 152 may discard the message. Details of the input modes associated with operating the autonomous vehicle will be described with respect to FIG. 2.

The guidance relay component 152 may perform operations that shield the inappropriate message to be transmitted to the autonomous vehicle. By way of example but not limitation, the guidance relay component 152 may determine to discard a message when the authority check of the message indicates that the message is not generated by an engaged user. The guidance relay component 152 may further determine to discard a message when the message does not comply with a current input mode. In at least one example, the guidance relay component 152 may determine a channel currently designated to communicate messages between the teleoperation system 170 and the autonomous vehicle 102. Information related to the designated channel may be synchronized between the teleoperation system 170 and the autonomous vehicle 102, via the network 156. The guidance relay component 152 may determine whether a message generated by a user is associated with the currently designated channel. The guidance relay component 152 may discard the message when the generated by a user is not associated with the currently designated channel.

The designated channel may indicate a type of the messages, a category of the messages or a common topic of the messages. By way of examples but not limitation, control messages may be transmitted over a control channel, user information may be transmitted over a user information channel, authority messages may be transmitted over an authority channel, guidance messages may be transmitted over a guidance channel, and the like. The computing devices 104 of the autonomous vehicle 102 and the teleoperating system 170 or the computing device(s) 180(1)-180(y) may store messages and the corresponding category/topic/channel in the memories 120 and 146, respectively. A set of possible messages may be pre-assigned to certain category/topic/channel. The categorization of the messages may be further learned based at least in the interactions between the autonomous vehicle 102 and the teleoperation system 170. The guidance relay component 152 may determine the designated channel base at least in part on the current input mode.

It should be appreciated that the functionalities of the components discussed herein are for illustration purpose but not limitation. The aspects of some or all of the components discussed herein may include any models, algorithms, and/or machine learning algorithms.

Figure 2:
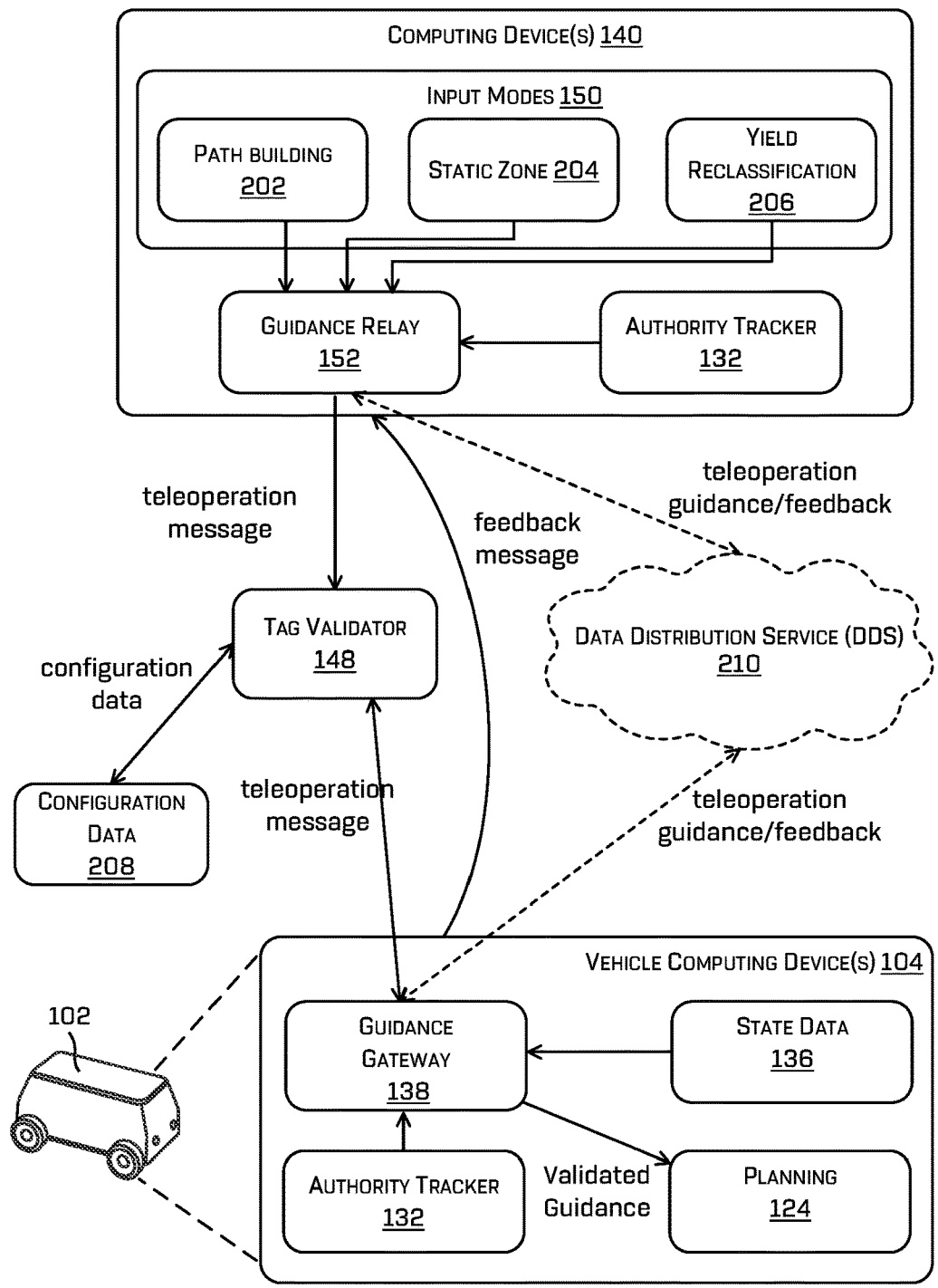
FIG. 2 illustrates a block diagram of an example system for authenticating a guidance provided to the autonomous vehicle, in accordance with examples of the disclosure.

FIG. 2 illustrates a block diagram of an example system for authenticating a guidance provided to the autonomous vehicle, in accordance with examples of the disclosure. As illustrated in FIG. 2, the messages and feedback messages are exchanged via a data distributing service (DDS) 210. In some examples of the disclosure, teleoperation messages generated by the users may be first authenticated and validated by the computing device(s) 140 of the teleoperation system 170 before being transmitted to the autonomous vehicle 102 through the DDS 210. The teleoperation messages may be further authenticated and validated by the computing device(s) 104 of the autonomous vehicle 102 before being executed to provide guidance to the autonomous vehicle 102. In the double authentication/validation technique provided by the disclosure, each of the teleoperation system 170 and the autonomous vehicle 102 may be configured with one or more shielding components to perform authentication and validation of the messages. By way of example but not limitation, the one or more shielding component may include at least one of the guidance relay component 152, the authority tracker 132, or the tag validator 148 implemented on the computing device(s) 140 of the teleoperation system 170, the guidance gateway 138, or the authority tracker 132 implemented on the computing device(s) 104 of the autonomous vehicle 102. In some examples, the tag validator 148 may be implemented in a remote computing device bridging the communication between the autonomous vehicle 102 and the teleoperation system 170. The computing device(s) 140 of the teleoperation system 170 may generate configuration data 208 associated with operation of the autonomous vehicle for validation purpose and share the configuration data 208 with the computing device(s) 104 of the autonomous vehicle 102 via the network 156. In at least one example, the configuration data 208 may be stored in the remote computing device bridging the communication between the autonomous vehicle 102 and the teleoperation system 170.

The authority tracker 132 implemented on the computing device(s) 140 of the teleoperation system 170 may track the information associated with the users that can be authorized to provide guidance to the autonomous vehicles. The authority tracker 132 may create and maintain a directory of the users associated with the teleoperation system 170. By way of example but not limitation, the directory of the users may include usernames or user IDs of the users, computing devices assigned to the users, IP addresses of the computing devices, signatures of the users, online/offline status of the users, engaging/disengaging status of the users, whether the autonomous vehicle 102 is authorized to control, etc. The authority tracker 132 may periodically receive status messages from the computing devices 180(1)-180(y). The status messages may indicate the online/offline status of the users and/or the engaging/disengaging status of the users. The authority tracker 132 may update the directory of users based at least in part on the periodical status messages.

The authority tracker 132 implemented on the computing device(s) 140 of the teleoperation system 170 may synchronize the information associated with the users with the authority tracker 132 implemented on the computing device(s) 104 of the autonomous vehicle 102, periodically, upon request from the autonomous vehicle 102. The authority tracker 132 implemented on the computing device(s) 104 of the autonomous vehicle 102 may perform the similar operations as the authority tracker 132 implemented on the computing device(s) 140 of the teleoperation system 170. Additionally, or alternatively, the authority tracker 132 implemented on the computing device(s) 104 of the autonomous vehicle 102 may determine whether the autonomous vehicle 102 wants to take over the authority and transmit the take-over request to the computing device(s) 140 of the teleoperation system 170.

The guidance relay component 152 may determine a current input mode associated with operating the autonomous vehicle 102. By way of example but not limitation, the input modes may include a path building mode 202, a static zone mode 204, or a yield reclassification mode 206. The path building mode 202 may indicate that the teleoperation system 170 is providing at least one trajectory having a plurality of points to guide the autonomous vehicle to navigate. The static zone mode 204 may indicate that the teleoperation system 170 is providing information related to any static objects or static zones in the environment. The yield reclassification mode 206 may indicate that the teleoperation system 170 is providing reclassification information of an object or an event occurred in the environment. The guidance relay component 152 may determine whether a message generated by a user complies with the current input mode associated with operating the autonomous vehicle 102.

In at least one example, a user may generate a message providing information related to a static zone when the current input mode is the path building mode 202. Based at least in part on the current input mode, the guidance relay component 152 may determine that the message providing information related to a static zone is a wrong message that should not be sent to the autonomous vehicle 102. In another example, a user may generate a message providing trajectory information, however, the autonomous vehicle 102 is waiting for reclassification information of an object that the autonomous vehicle 102 detected in the pathway. Based at least in part on the current input mode being the yield reclassification mode 206, the guidance relay component 152 may determine that the message providing the trajectory information does not comply with the current input mode and discard the message. In at least some examples, such a guidance relay component 152 may further rectify small errors in such guidance requests. As non-limiting examples, a guidance trajectory may be validated against sensor data (and/or derivatives therefrom, such as, but not limited to, locations of static and dynamic objects), such as, by computing a cost (which may comprise a collision cost). In at least some such examples, where the cost exceeds a safety cost (e.g., where the guided waypoints may come too close to a vehicle), minor perturbations and optimizations may be performed by such a guidance relay component 152 to determine whether a new, safe, path can be determined (e.g., which may be caused by discrepancies in data between the remote and local systems, such as due to latencies, etc.).

The messages generated by the users to provide guidance to the autonomous vehicle may be automatically enclosed with identification information the user, e.g., a signature of the user. By way of example but not limitation, the signature of the user may be encrypted a public key infrastructure (PKI), a private key infrastructure, a public key/private key pair, a hash of the data bytes of the message, a globally unique identifier (GUID), or any combination thereof. The identification information the user and/or the encryption/decryption information may be hard coded on the autonomous vehicle 102. Additionally, or alternatively, the identification information of the user and/or the encryption/decryption information may be soft coded and shared between the autonomous vehicle 102 and the teleoperation system 170. The tag validator 148 may decrypt the signature from the message using shared public key, private key, hash code, or GUID and verify whether the signature matches the one stored in the directory of users. The tag validator 148 may determine the message is from an unauthorized user based at least in part on the signature not matching the one stored in the directory of users and discard the message. In some examples, when the decrypted signature may be corrupted, the tag validator 148 may determine that the signature validation fails and discard the message. In another example, the tag validator 148 may determine that the signature of the user is missing from the message and discard the message.

In some examples, different components of the autonomous vehicle 102 may be configured with individual input controllers or control mapping configuration. The input controllers or the control mapping configuration may indicate that when a hotkey or a combination of certain hotkeys is pressed down, a corresponding component of the autonomous vehicle 102 is activated. In circumstances that the user presses down a first hotkey or a combination of certain first hotkeys causing generating an instruction to activate a first component, the guidance relay component 152 may determine whether the first component is currently selected to operate. If the current selected component is a second component controlled by a different hotkey or a different combination of hotkeys, the guidance relay component 152 may determine that the instruction should not be directed to the second component and discard the instruction. For example, a user may press down a combination of "Ctrl" and "S" keys causing sending a static zone instruction while the currently selected component, i.e., the active component is the path builder component. The guidance relay component 152 may determine that the static zone instruction is erroneous and discard the instruction.

Once the message generated by a user is authenticated and validated by the computing device(s) 140 of the teleoperation system 170, the message may be transmitted to the computing device(s) 104 of the autonomous vehicle 102 via the network 156. The guidance gateway component 138 implemented on the computing device(s) 104 of the autonomous vehicle 102, upon receiving the message, may perform various operations to further authenticate and validate the message before the message is executed. As described above with respect to FIG. 1, the guidance gateway component 138 may authenticate the message from the teleoperation system 170 based at least in part on the encrypted identification information the user. The guidance gateway component 138 may determine whether the message is from an engaged user and whether the message is properly signed by the engaged user. The guidance gateway component 138 may further determine whether the message is transmitted over a channel currently designated for communication between the autonomous vehicle 102 and the teleoperation system 170.

In some examples, the computing device 104 may further validate the guidance in the message before executing the guidance based at least in part on the configuration data 208 associated with operation of the autonomous vehicle. The configuration data 208 may be created by the teleoperation system 170 and stored in both the memory 120 of the computing device(s) 104 of the autonomous vehicle 102 and the memory 146 of the computing device(s) 140 of the teleoperation system 170. Additionally, or alternatively, the configuration data 208 may be stored in a remote computing device and shared by the autonomous vehicle 102 and the teleoperation system 170.

By way of example but not limitation, the configuration data 208 may include a speed range of the autonomous vehicle 102 (i.e., minimum and maximum speeds of the autonomous vehicle), size and shape data of a static zone, relative locations of the static region, curvature data between points associated with a trajectory, maximum number of points associated with the trajectory, geofence data, etc. For example, when the message instructs the autonomous vehicle 102 to hold or stop while the autonomous vehicle 102 is driving faster than the pre-set minimum speed, the computing device 104 may reject the message. In at least some examples, however, such maximum values may be taken into account and a new control may be determined based on local maximums available at the vehicle. In such an example, such altered commands (e.g., being constrained within limits of the vehicle given a current state of the vehicle) may be validated with respect to overcoming a given scenario.

In another example, when the guidance includes points in a trajectory where at least part of the points is spaced greater than a pre-set distance, the computing device 104 may reject the message. In another example, when the guidance includes points in a trajectory where the maximum curvature between samples is greater than a pre-set angle, the computing device 104 may reject the message. The curvature discussed herein may refer to a degree of deviation from the straight path. In another example, when the guidance includes a planned trajectory having a count of points exceeding a pre-set maximum number of points (e.g., 2000 points), the computing device 104 may determine the guidance is not a valid guidance and reject the message. In yet another example, when the guidance includes information associated with the static zone, the computing device 104 may determine at least one of whether the static zone overlaps the position of the autonomous vehicle 102, whether the count of points representing the static zone is beyond a pre-set range (e.g., 3-36 points), whether the points are coplanar, whether the distance of the static zone to the autonomous vehicle is within a pre-set distance (e.g., 500 m), whether the area of the static zone is between 1 m$^2$ and 1000 m$^2$, or whether the maximum side length is no greater than 50 m, etc. When the static zone overlaps the position of the autonomous vehicle 102, or the count of points representing the static zone is beyond the pre-set range, or the points are not coplanar, or the distance of the static zone to the autonomous vehicle is beyond the pre-set distance, or the area of the static zone is beyond the pre-set area range, or the maximum side length is greater than the pre-set length, the computing device 104 may reject the message. As above, minor perturbations may be tested against the guided trajectory to determine if inconsistencies between local and remote values (for state, data, etc.) would safely overcome the current predicament of the vehicle.

It should be appreciated that the authentication and validation process of the message transmitted between the teleoperation system 170 and the autonomous vehicle 102 discussed herein is for illustration purpose. The present disclosure is not intended to be limiting. The authentication and validation process may be performed by the computing device(s) 140 of the teleoperation system 170, e.g., the guidance relay component 152 only. In some examples, the authentication and validation process may be performed by the computing device(s) 104 of the autonomous vehicle 102, e.g., the guidance gateway component 138 only. In another example, the authentication and validation process may be performed by both the computing device(s) 140 of the teleoperation system 170 and the computing device(s) 104 of the autonomous vehicle 102. In yet another example, the authentication process may be performed by the computing device(s) 140 of the teleoperation system 170 and the validation process may be performed by the computing device(s) 104 of the autonomous vehicle 102. The results of the authentication and validation may be shared between the computing device(s) 140 of the teleoperation system 170 and the computing device(s) 104 of the autonomous vehicle 102.

When a message providing guidance to the autonomous vehicle is authenticated and validated, the guidance may be transmitted to a component of the autonomous vehicle 102 to execute, e.g., the planning component 124 to determine a trajectory for the autonomous vehicle 102 to navigate through the environment.

FIGS. 3-7 illustrate pictorial flow diagrams of example processes for implementing the techniques discussed herein. By way of example and without limitation, the processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined (or omitted) in any order and/or in parallel to implement the processes. In some examples, multiple branches represent alternate implementations that may be used separately or in combination with other operations discussed herein.

Figure 3:
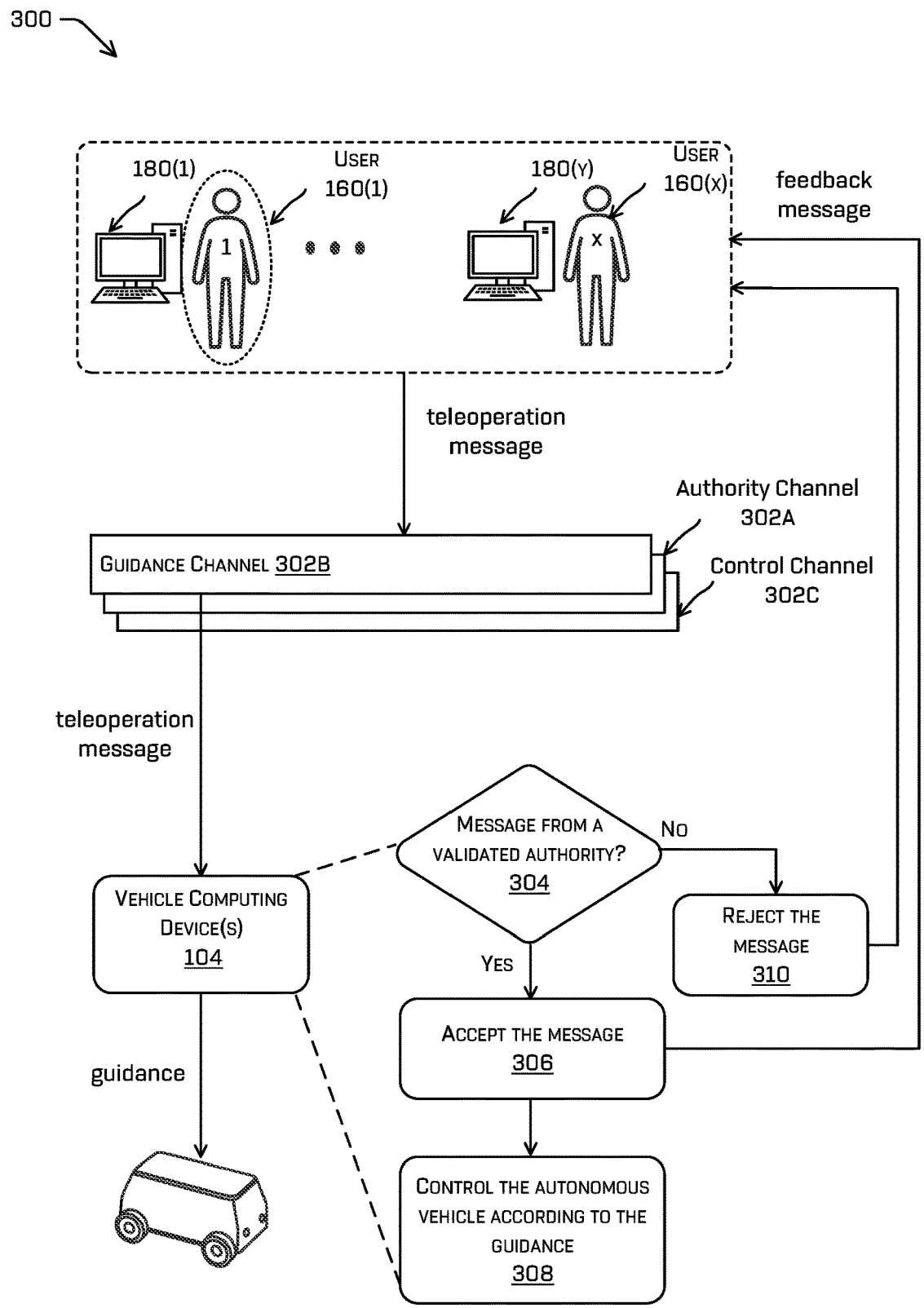
FIG. 3 illustrates a pictorial flow diagram of an example process for authenticating a guidance provided to the autonomous vehicle, in accordance with examples of the disclosure.

FIG. 3 illustrates a pictorial flow diagram of an example process 300 authenticating a guidance provided to the autonomous vehicle, in accordance with examples of the disclosure. As illustrated in FIG. 3, one of the user(s) 160(1)-160(x), i.e., an engaged user, may transmit a teleoperation message via one of the corresponding computing device(s) 180(1)-180(y) to the autonomous vehicle 102. The teleoperation system 170 shown in FIG. 1 may designate a channel to communicate messages between the autonomous vehicle 102 and the teleoperation system 170. For example, the teleoperation system 170 may designate an authority channel 302A to communicate messages between the autonomous vehicle 102 and the teleoperation system 170 before the autonomous vehicle 102 starts driving. The teleoperation system 170 may transmit an authority message with information of the engaged user to the autonomous vehicle over the authority channel 302A. The teleoperation system 170 may further transmit message with information of all online users to the autonomous vehicle over the authority channel 302A. By transmitting such messages, the teleoperation system 170 may inform the autonomous vehicle 102 that an engaged user is actively observing its operation and can provide guidance during its operation and other disengaged users may be passively observing its operation but have no authority to provide guidance.

Once the authority information is shared and synchronized between the autonomous vehicle 102 and the teleoperation system 170, the teleoperation system 170 may instruct the autonomous vehicle to switch from the authority channel 302A to a guidance channel 302B. A teleoperation message providing guidance to the autonomous vehicle 102 may be generated by the engaged user through the corresponding computing device and transmitted to the autonomous vehicle 102 over the guidance channel 302B.

At operation 304, the computing device(s) 104 of the autonomous vehicle 102 may determine whether the teleoperation message providing guidance to the autonomous vehicle 102 is from a validated authority. The computing device(s) 104 may decrypt the identification information enclosed in the teleoperation message and compare the decrypted identification information with stored information associated with the user(s) 160(1)-160(x). When the identify information represents the signature of the user who generates the teleoperation message, the computing device(s) 104 may determine whether the user is the engaged user and/or whether the signature is a genuine signature of the engaged user based at least in part on the signature comparison result.

When the message is determined to be from a validated authority, at operation 306, the computing device(s) 104 may accept the message.

At operation 308, the computing device(s) 104 may control the autonomous vehicle 102 according to the guidance.

When the message is determined as not from a validated authority, at operation 310, the computing device(s) 104 may reject the message and send a feedback message to the teleoperation system 170.

Figure 4:
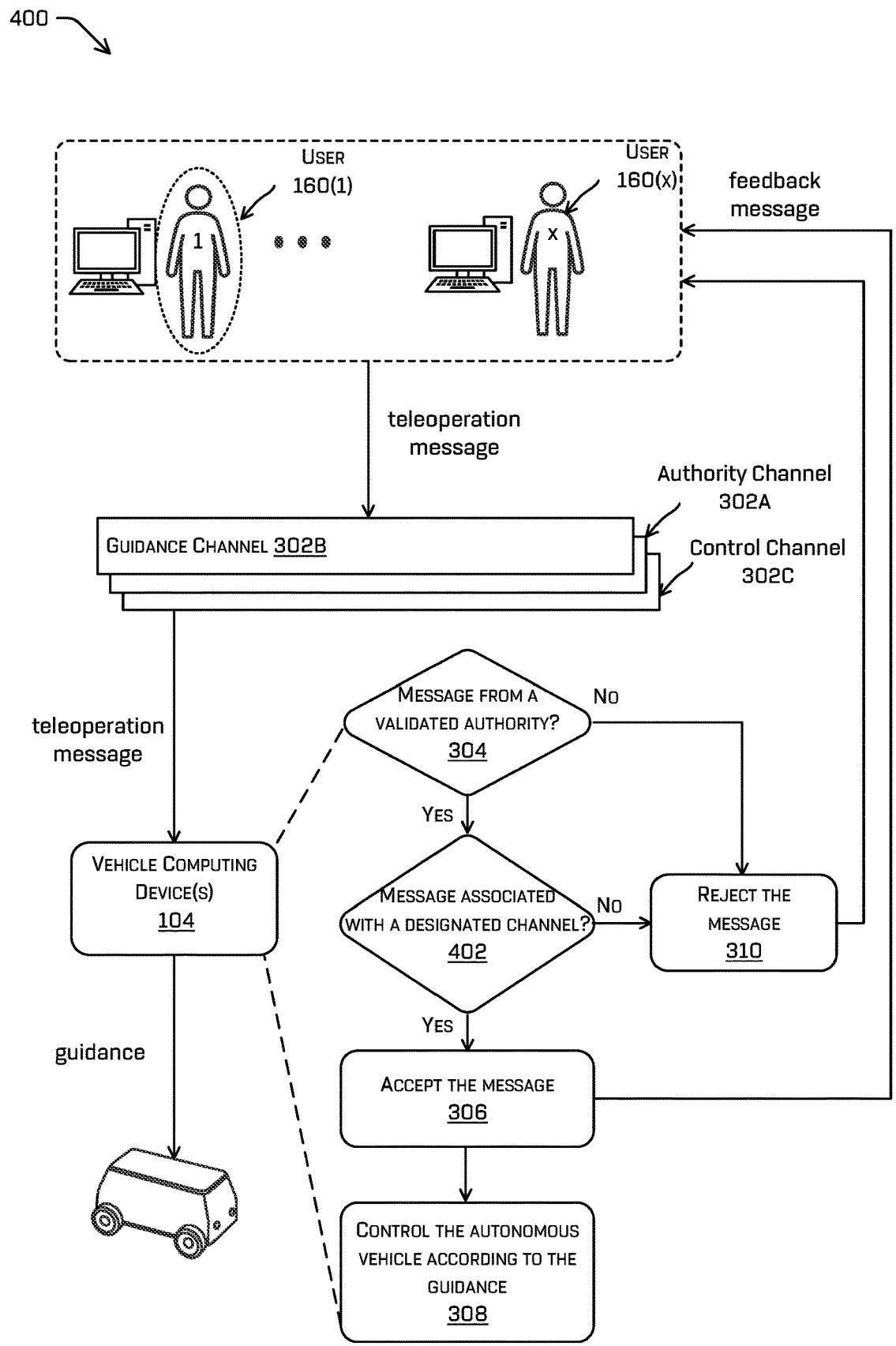
FIG. 4 illustrates a pictorial flow diagram of another example process for authenticating a guidance provided to the autonomous vehicle, in accordance with examples of the disclosure.

FIG. 4 illustrates a pictorial flow diagram of an example process 400 for authenticating a guidance provided to the autonomous vehicle, in accordance with examples of the disclosure.

According to the examples illustrated in FIG. 4, when the teleoperation message is determined to be from a validated authority, at operation 402, the computing device(s) 104 may further determine whether the teleoperation message is transmitted over a designated channel, for example, an authority channel 302A, a guidance channel 302B, or a control channel 302C.

When the teleoperation message is transmitted over a designated channel, the computing device(s) 104 may accept the message at operation 306 and control the autonomous vehicle according to the guidance at operation 308. When the teleoperation message is not transmitted over a designated channel, the computing device(s) 104 may reject the message at operation 310 and send a feedback message to the teleoperation system 170. For example, when the designated channel is the guidance channel 302B and a message related to control the internal temperature of the autonomous vehicle 102 is transmitted over the control channel 302C, the computing device(s) 104 may reject the message. In another example, when the designated channel is the guidance channel 302B and a message related to authority change is transmitted over the authority channel 302A, the computing device(s) 104 may reject the message. However, in circumstances that the authority channel 302A exists independently from the designated channel, the computing device(s) 104 may accept the message transmitted over the authority channel and temporarily discard the messages transmitted over the guidance channel 302B until the authority change is updated in the computing device(s) 104.

Figure 5:
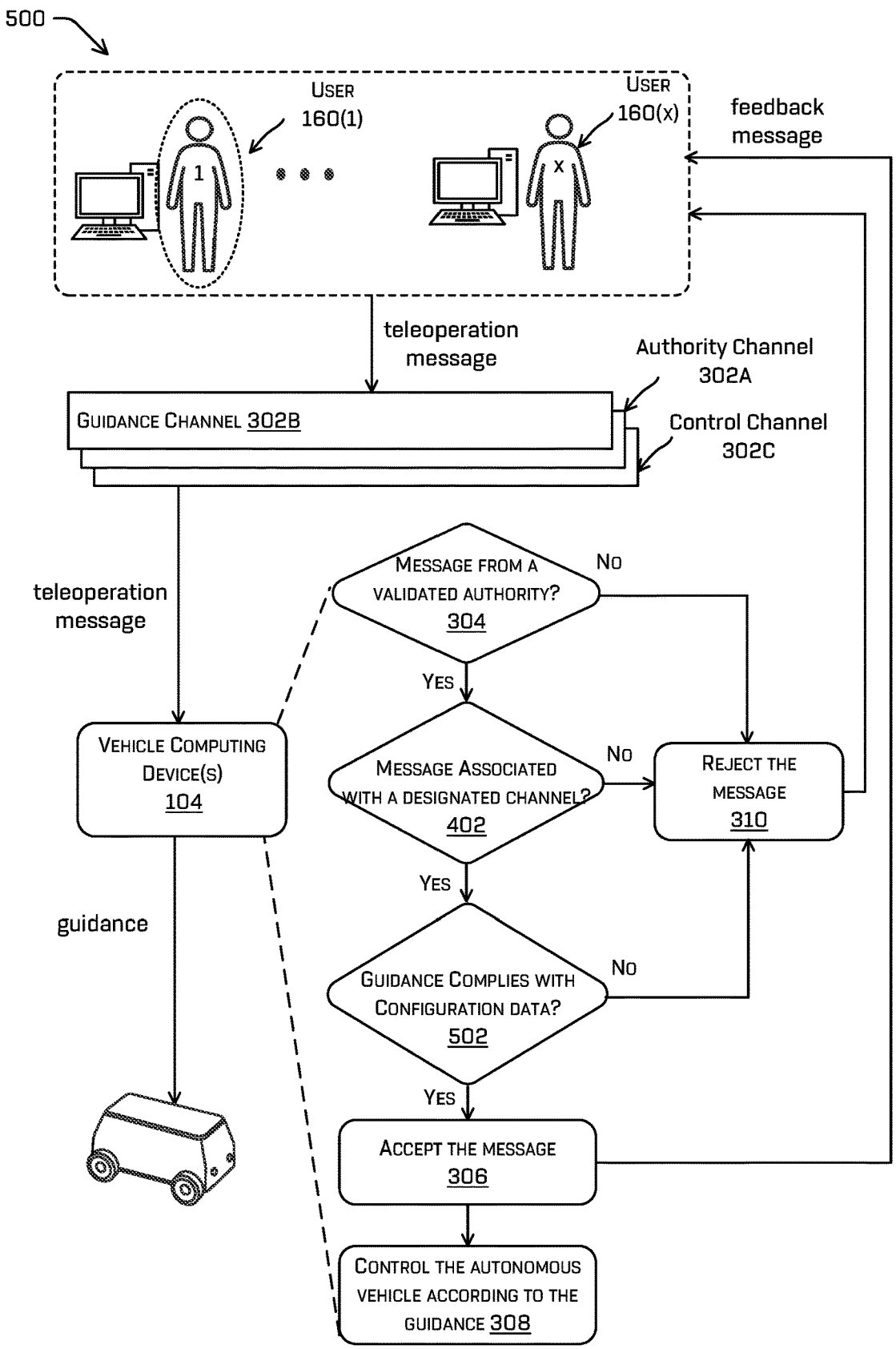
FIG. 5 illustrates a pictorial flow diagram of another example process for authenticating a guidance provided to the autonomous vehicle, in accordance with examples of the disclosure.

FIG. 5 illustrates a pictorial flow diagram of an example process 500 for authenticating a guidance provided to the autonomous vehicle, in accordance with examples of the disclosure.

According to the examples illustrated in FIG. 5, when the teleoperation message is determined to be from a validated authority and when the teleoperation message is transmitted over the designated channel, at operation 502, the computing device(s) 104 may further determine whether the guidance complies with configuration data associated with operation of the autonomous vehicle 102.

When the guidance complies with a pre-set configuration associated with operation of the autonomous vehicle 102, the computing device(s) 104 may accept the message at operation 306 and control the autonomous vehicle according to the guidance at operation 308. When the guidance does not comply with pre-set configuration data associated with operation of the autonomous vehicle 102, the computing device(s) 104 may reject the message at operation 310 and send a feedback message to the teleoperation system 170. The pre-set configuration data may define one or more parameters associated with the operation of the autonomous vehicle 102 (e.g., speed, acceleration, planned trajectory, static zone, etc.) and one or more thresholds and/or ranges associated with the one or more parameters. In at least one example, when the guidance includes a suggested driving speed, the computing device(s) 104 may determine whether the suggested driving speed is within the pre-set range. If the maximum driving speed is set as 50 mph, the guidance including a suggested driving speed at 80 mph may be rejected.

Figure 6:
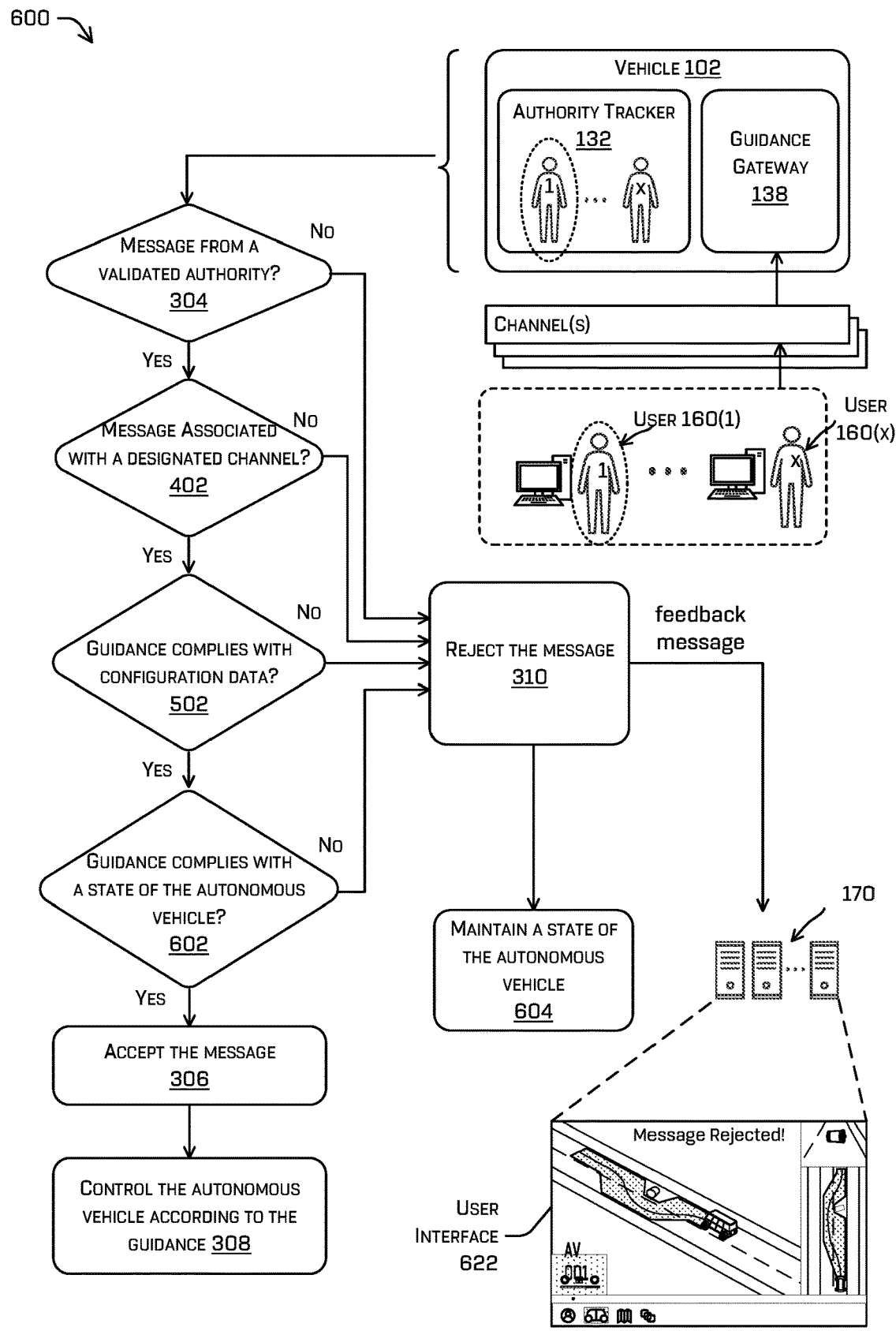
FIG. 6 illustrates a pictorial flow diagram of another example process for authenticating a guidance provided to the autonomous vehicle, in accordance with examples of the disclosure.

FIG. 6 illustrates a pictorial flow diagram of an example process 600 for authenticating a guidance provided to the autonomous vehicle, in accordance with examples of the disclosure.

According to the examples illustrated in FIG. 6, when the teleoperation message is determined to be from a validated authority, the teleoperation message is transmitted over the designated channel, and the guidance complies with the pre-set configuration data, at operation 602, the computing device(s) 104 may further determine whether the guidance complies with a state of the autonomous vehicle 102.

When the guidance complies with a state of the autonomous vehicle 102, the computing device(s) 104 may accept the message at operation 306 and control the autonomous vehicle according to the guidance at operation 308. When the guidance does not comply with a state of the autonomous vehicle 102, the computing device(s) 104 may reject the message at operation 310, send a feedback message to the teleoperation system 170, and maintain the state of the autonomous vehicle at operation 604. The state of the autonomous vehicle 102 discussed herein may be represented by the input modes component 150 shown in FIG. 2. By way of example but not limitation, the input modes may include a path building mode, a static zone mode, or a yield reclassification mode. In at least one example, when the teleoperation message providing a planned trajectory when the current input mode (i.e., the state of the autonomous vehicle 102) is the static zone mode, the computing device(s) 104 may reject the teleoperation message. In another example, when the autonomous vehicle 102 detects an object in the pathway and requests yield reclassification, a teleoperation message is generated providing one or more new points in the trajectory causing the autonomous vehicle 102 to drive straight. The computing device(s) 104 may reject the teleoperation message. Further, the feedback message may be displayed on a user interface 622 at the computing device(s) 180(1)-180(y) associated with the users.

Figure 7:
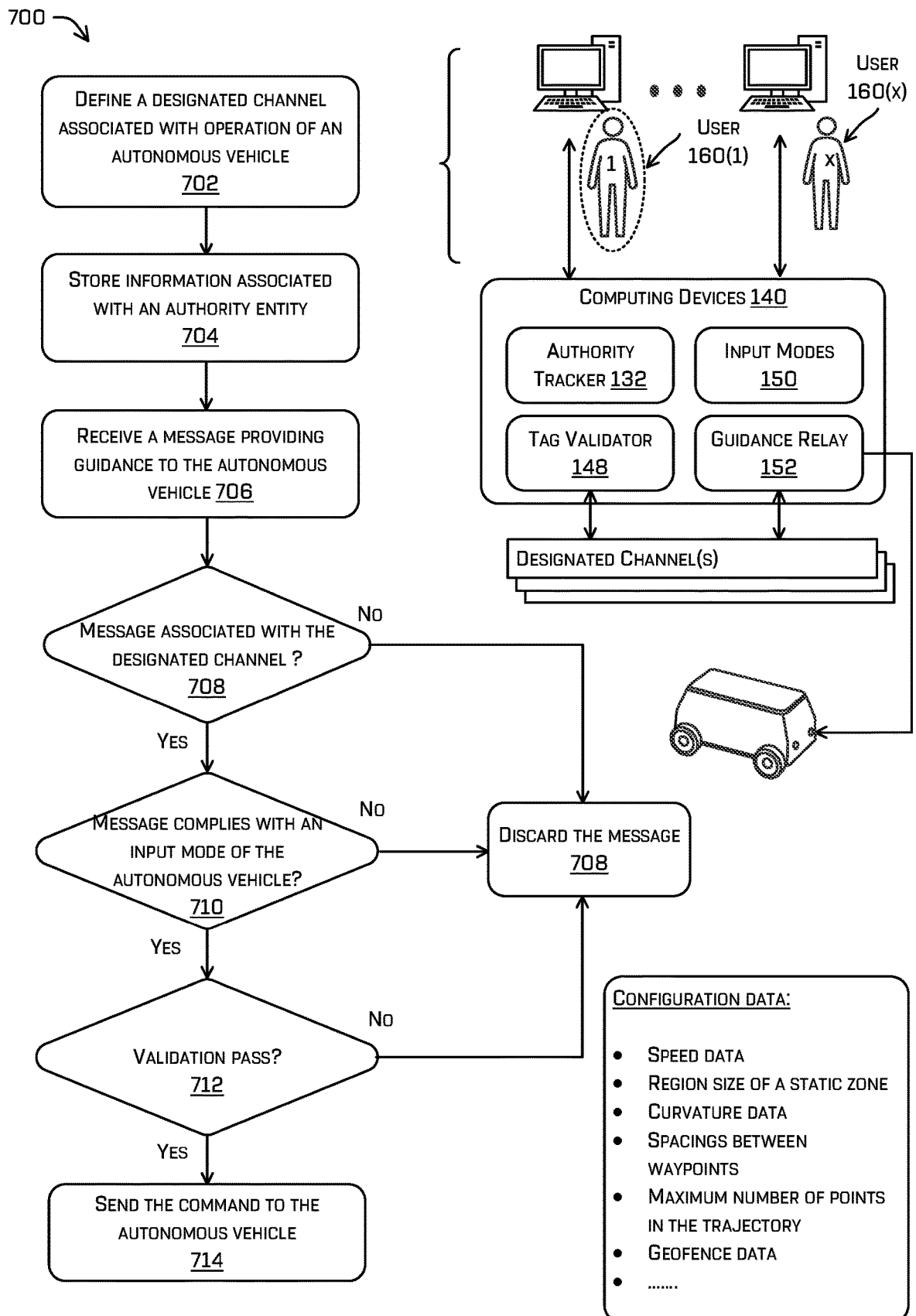
FIG. 7 illustrates a pictorial flow diagram of another example process for authenticating a guidance provided to the autonomous vehicle, in accordance with examples of the disclosure.

FIG. 7 illustrates a pictorial flow diagram of an example process 700 for authenticating a guidance provided to the autonomous vehicle, in accordance with examples of the disclosure.

The flowchart in FIG. 7 describes the authentication and validation process performed by the teleoperation system 170.

At operation 702, the computing device(s) 140 of the teleoperation system 170 may define a designated channel associated with operation of an autonomous vehicle. The designated channel associated with operation of an autonomous vehicle discussed herein may refer to a common topic of the messages, a type of the messages provided to the autonomous vehicle, or a category of the messages provided to the autonomous a common topic of the messages. By way of example but not limitation, the designated channel may include a control channel, a user information channel, an authority channel, a guidance channel, etc. The computing device(s) 140 of the teleoperation system 170 may define a set of possible inputs (e.g., messages transmitted between the autonomous vehicle and the teleoperation system) to be related to certain category/topic/channel. The set of possible inputs (e.g., messages transmitted between the autonomous vehicle and the teleoperation system) and the corresponding category/topic/channel may be stored as a mapping table in the memory 146 of the teleoperation system 170 and/or synchronized in the memory 120 of the autonomous vehicle 102.

At operation 704, the computing device(s) 140 may store information associated with an authority entity. The computing device(s) 140 may maintain a directory of users that are associated with the teleoperation system 170. The directory of users may include the user log in information of the users (e.g., username or user ID in the teleoperation system 170), user authentication information (e.g., signatures of the users), online/offline status of the users, engaging/disengaging status of the users, geographic location when the users log in the teleoperation system 170, etc. In some examples, the autonomous vehicle 102 itself may be an engaged user having authority to provide guidance. The directory of users may further store information associated with the autonomous vehicle 102. In some examples, the autonomous vehicle 102 may be hard coded or soft coded to accept guidance from the users located within a predetermined geographic area. In other examples, the autonomous vehicle 102 may be hard coded or soft coded to accept guidance from one or more pre-set users. In yet other examples, the autonomous vehicle 102 may be hard coded or soft coded to accept the guidance from the teleoperation system 170 at pre-set time periods.

At operation 706, the computing device(s) 140 may receive a message providing guidance to the autonomous vehicle. The message may be a teleoperation message generated by an engaged user or a disengaged user. The teleoperation message may be generated by the engaged user or the disengaged user based at least in part on the analysis of the sensor data transmitted from the autonomous vehicle 102. In some examples, the teleoperation message may be generated by mistake, e.g., the user accidently hitting the keyboard or touching the touch screen causing generating a message. The teleoperation message may be signed by the sender, i.e., the engaged user or the disengaged user. The signature of the sender may be encrypted in the teleoperation message. The encryption of the signature may be achieved by performing a hash coding, a public key, a private key, a public key/private key pair, a GUID, or any algorithms applied to authority encryption.

At operation 708, the computing device(s) 140 may determine whether the message is associated with the designated channel. Before transmitting the teleoperation message to the autonomous vehicle 102, the computing device(s) 140 may determine whether the teleoperation message can be categorized into the designated channel. The computing device(s) 140 may check the mapping table including a plurality of messages and the corresponding category/topic/channel. Based at least in part on the mapping table, if the teleoperation message is related to the designated channel, the computing device(s) 140 may perform operation 710 to accept the teleoperation message. In some examples, the computing device(s) 140 may input the teleoperation message into a machine learned model to determine which channel the teleoperation message is associated with. The machine learned model may output one or more probabilities indicating the respective likelihoods of the teleoperation message associating with one or more channels. The computing device(s) 140 may select the channel with the highest probability and compare it with the designated channel. If the comparison indicates that the selected channel is not the designated channel, the computing device(s) 140 may perform operation 708 to discard the teleoperation message.

At operation 710, the computing device(s) 140 may determine whether the message complies with an input mode of the autonomous vehicle. Before transmitting the teleoperation message to the autonomous vehicle 102, the computing device(s) 140 may determine whether the teleoperation message provides effective guidance to the autonomous vehicle 102 considering the current state of the autonomous vehicle 102. The computing device(s) 140 may obtain information related to the current state of the autonomous vehicle 102 based at least in part on the input modes 150 illustrated in FIG. 2. If the teleoperation message does not comply with the input mode of the autonomous vehicle 102, e.g., the teleoperation message being a static zone while the input mode is path building, the computing device(s) 140 may perform operation 708 to discard the teleoperation message.

At operation 712, the computing device(s) 140 may further validate the teleoperation message. Even though the teleoperation message may be generated by an engaged user and complies with the current state of the autonomous vehicle, the computing device(s) 140 may further determine whether the teleoperation message provides valid instruction(s) based at least in part on configuration data associated with operation of the autonomous vehicle 102. By way of example but not limitation, the configuration data may include speed limitations of the autonomous vehicle, curvature ranges between points associated with a trajectory, maximum number of points associated with the trajectory, geographic information, etc. The teleoperation message providing the guidance which is beyond the settings of the configuration data may be discarded. For example, the teleoperation message may provide the guidance of driving at 100 mph, which exceeds the maximum speed, the computing device(s) 140 may discard the teleoperation message. In another example, the teleoperation message may provide the guidance of driving through a military base (or other restricted area), the computing device(s) 140 may discard the teleoperation message. In yet another example, the teleoperation message may provide the guidance of holding two minutes at a busy intersection, the computing device(s) 140 may discard the teleoperation message.

At operation 714, the computing device(s) 140 may send the teleoperation message to the autonomous vehicle. Once it is determined that the teleoperation message is generated by an engaged user, complies with the current state of the autonomous vehicle, and passes the validation check, the computing device(s) 140 may send the teleoperation message to the autonomous vehicle 102.

At operation 716, the computing device(s) 140 may discard the teleoperation message. When the teleoperation message is not generated by an engaged user or does not comply with the current state of the autonomous vehicle, or does not pass the validation check, the computing device(s) 140 may discard the teleoperation message so that the wrong or improper guidance is not transmitted to the autonomous vehicle.

Example Clauses

A. An autonomous vehicle comprising: one or more processors; a network interface; and a memory storing instructions executable by the one or more processors, wherein the instructions, when executed, cause the autonomous vehicle perform operations comprising: storing information associated with a computing device, the information indicating that the computing device is authorized to provide guidance to the autonomous vehicle; storing message type information indicating a type of message associated with the guidance; receiving, via the network interface, a message associated with providing a first guidance to the autonomous vehicle; determining, based at least in part on the information, that the message is associated with the computing device; determining that the message is associated with the type of message; determining that the message complies with configuration data associated with maneuvering the autonomous vehicle and state information associated with the autonomous vehicle; and controlling the autonomous vehicle based at least in part on the message.

B. The autonomous vehicle as paragraph A recites, the operations further comprising: determining, based at least in part on sensor data, the state information of the autonomous vehicle; and determining that the first guidance complies with the state information, wherein the state information of the autonomous vehicle comprises at least one of location data, pose data, or velocity data.

C. The autonomous vehicle as paragraph A or B recites, wherein the type of message is one of a plurality of message types comprising one or more of: a guidance message; an authority message; a state message; a perception message; a localization message; or a map message.

D. The autonomous vehicle as any one of paragraphs A-C recites, wherein determining that the message is associated with the computing device comprises: receiving, identification information identifying the computing device generating the message; and determining, based at least in part on the identification information, that the computing device comprises authority to provide guidance to the autonomous vehicle, wherein the identification information is encoded using at least one of a public key infrastructure (PKI), a private key infrastructure, a hash of message bytes, or a globally unique identifier (GUID).

E. The autonomous vehicle as any one of paragraphs A-D recites, wherein the configuration data associated with maneuvering the autonomous vehicle comprises at least one of: speed data of the autonomous vehicle; region size and shape data of associated with a static region zone; curvature data between points associated with a trajectory; spacing data between the points associated with the trajectory; maximum number of the points associated with the trajectory; or geofence data.

F. A method comprising: storing receiving information associated with a computing device, the information indicating that the computing device is authorized to provide guidance information to an autonomous vehicle; receiving, via a network interface, a message comprising the guidance information associated with the autonomous vehicle; determining, based at least in part on the information, that the message is associated with the computing device; evaluating the message based at least in part on at least one of configuration data associated with maneuvering the autonomous vehicle or state information associated with the autonomous vehicle; and controlling the autonomous vehicle based at least in part on evaluating the message.

G. The method as paragraph F recites, wherein evaluating the message comprises determining that the message does not comply with at least one of the configuration data or the state information; and wherein the method further comprises: controlling the autonomous vehicle comprises rejecting the message; and maintaining a current state of the autonomous vehicle.

H. The method as paragraph F or G recites, further comprising: sending, via the network interface, a feedback message indicating that the message was rejected by the autonomous vehicle.

I. The method as any one of paragraphs F-H recites, further comprising: determining a type of message associated with the message; and determining that the type of message is associated with the information a designated message type of the guidance information; wherein the type of message is one of a plurality of message types comprising one or more of: a guidance message; an authority message; a state message; a perception message; a localization message; or a map message.

J. The method as any one of paragraphs F-I recites, wherein evaluating the message comprises determining that the message is associated with a first type of messages; and wherein the method further comprising: accepting the message; and controlling the autonomous vehicle based at least in part on the guidance information in the message.

K. The method as any one of paragraphs F-J recites, further comprising: receiving, identification information identifying the computing device generating the message; and determining, based at least in part on the identification information, that the computing device comprises authority to provide guidance to the autonomous vehicle, wherein the identification information is encoded using at least one of a public key infrastructure (PKI), a private key infrastructure, a hash of message bytes, or a globally unique identifier (GUID).

L. The method as any one of paragraphs F-K recites, further comprising: determining, based at least in part of sensor data, a state of the autonomous vehicle; determining whether the guidance information complies with the state of the autonomous vehicle; wherein accepting the message and controlling the autonomous vehicle comprises controlling the autonomous vehicle based at least in part on the guidance information in response to the guidance information complying with the state of the autonomous vehicle; and rejecting the message and maintaining the state of the autonomous vehicle in response to the guidance information not complying with the state of the autonomous vehicle, wherein the state of the autonomous vehicle comprises at least one of: a path building state, a static zone state, a yield reclassification state, location of the autonomous vehicle, map data, speed of the autonomous vehicle, pose of the autonomous vehicle, occupancy of the autonomous vehicle, or objects around the autonomous vehicle.

M. The method as any one of paragraphs F-L recites, wherein: the state of the autonomous vehicle is the path building state; the guidance information comprising adding a waypoint to a planned trajectory; and determining whether the guidance information complies with the state of the autonomous vehicle further comprises at least one of: determining that a distance between a first point associated with the planned trajectory and the waypoint is less than or equal to a distance threshold; or determining that a curvature value associated with a segment associated with the first point and the waypoint is less than or equal to a curvature threshold.

N. The method as any one of paragraphs F-M recites, wherein: the state of the autonomous vehicle is the yield reclassification state; the guidance information comprising comprises driving at a first speed and a steering angle; and determining whether the guidance information complies with the state of the autonomous vehicle further comprises at least one of: determining that the first speed is greater than or equal to a speed threshold; or determining that the steering angle causing a collision of the autonomous vehicle with an obstacle.

O. The method as any one of paragraphs F-N recites, wherein: the state of the autonomous vehicle is the static zone state; the guidance information comprising comprises a size and a location of within the static zone; and determining whether the guidance information complies with the state of the autonomous vehicle further comprises at least one of: determining that the area size of the static zone is within a size range; or determining that the location of the static zone is beyond outside of a pre-set area.

P. A non-transitory computer-readable medium storing instructions that, when executed, cause one or more processors to perform operations comprising: storing receiving information associated with a computing device indicating that the computing device is authorized to provide guidance information to a vehicle; receiving, via a network interface, a message comprising the guidance information associated with the vehicle; determining, based at least in part on the information, that the message is associated with the computing device; evaluating the message based at least in part on at least one of configuration data associated with maneuvering the vehicle or state information associated with the vehicle; and controlling the vehicle based at least in part on evaluating the message.

Q. The non-transitory computer-readable medium as paragraph P recites, wherein evaluating the message comprises determining that the message does not comply with at least one of the configuration data or the state information, and controlling the vehicle further comprises: rejecting the message; and maintaining a current state of the vehicle.

R. The non-transitory computer-readable medium as paragraph P or Q recites, wherein the operations further comprise: determining, based at least in part of sensor data, a state of the vehicle; determining whether the guidance information complies with the state of the vehicle; wherein accepting the message and controlling the vehicle comprises controlling the vehicle based at least in part on the guidance information in response to the guidance information complying with the state of the vehicle; and rejecting the message and maintaining the state of the vehicle in response to the guidance information not complying with the state of the vehicle, wherein the state of the vehicle comprises at least one of: a path building state, a static zone state, a yield reclassification state, location of the vehicle, map data, speed of the vehicle, pose of the vehicle, occupancy of the vehicle, or objects around the vehicle.

S. The non-transitory computer-readable medium as any one of paragraphs P-R recites, wherein the configuration data associated with maneuvering the vehicle comprises at least one of: speed data of the vehicle; region size and shape data of a static zone; curvature data between points associated with a trajectory; spacing data between the points associated with the trajectory; maximum number of the points associated with the trajectory; or geofence data.

T. The non-transitory computer-readable medium as any one of paragraphs P-S recites, wherein the state of the vehicle is the path building state; the guidance information comprising adding a waypoint to a planned trajectory; and determining whether the guidance information complies with the state of the vehicle further comprises at least one of: determining that a distance between a first point associated with the planned trajectory and the waypoint is less than or equal to a distance threshold; or determining that a curvature value associated with a segment associated with the first point and the waypoint is less than or equal to a curvature threshold.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code modules and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving information associated with a computing device;
receiving a message from the computing device comprising guidance information associated with a vehicle;
authorizing the message from the computing device to control the vehicle based at least in part on at least one of configuration data associated with maneuvering the vehicle or state information associated with the vehicle, wherein authorizing the message is performed at the vehicle and comprises determining that the message complies with at least one of the configuration data or the state information; and
controlling the vehicle based at least in part on authorizing the message.

2. The method of claim 1, wherein the state information comprises at least one of location data, pose data, or velocity data associated with the vehicle.

3. The method of claim 1, wherein authorizing the message further comprises:
determining, based at least in part on sensor data, a state of the vehicle; and
determining that the guidance information complies with the state of the vehicle.

4. The method of claim 1, wherein the configuration data defines a parameter, and authorizing the message further comprises:
determining, based at least in part on the guidance information being within a predetermined threshold of the parameter, that the guidance information complies with the configuration data.

5. The method of claim 1, wherein the configuration data associated with maneuvering the vehicle comprises at least one of:
speed data of the vehicle;
size and shape data associated with a static zone;
curvature data between points associated with a trajectory;
spacing data between the points associated with the trajectory;
a maximum number of the points associated with the trajectory; or
geofence data.

6. A vehicle comprising:
one or more processors; and
memory storing instructions executable by the one or more processors, wherein the instructions, when executed, configure the vehicle to perform operations comprising:
receiving information associated with a computing device;
receiving a message from the computing device comprising guidance information associated with the vehicle;
authorizing the message from the computing device to control the vehicle based at least in part on at least one of configuration data associated with maneuvering the vehicle or state information associated with the vehicle, wherein authorizing the message is performed at the vehicle and comprises determining that the message complies with at least one of the configuration data or the state information; and
controlling the vehicle based at least in part on authorizing the message.

7. The vehicle of claim 6, wherein the state information comprises at least one of location data, pose data, or velocity data associated with the vehicle.

8. The vehicle of claim 6, wherein authorizing the message further comprises:
determining, based at least in part on sensor data, a state of the vehicle; and
determining that the guidance information complies with the state of the vehicle.

9. The vehicle of claim 6, further comprising:
determining, based at least in part on sensor data, a state of the vehicle, and wherein the state of the vehicle comprises at least one of:
a path building state,
a static zone state,
a yield reclassification state,
a location of the vehicle,
map data,
a speed of the vehicle,
a pose of the vehicle,
an occupancy of the vehicle, or
an object proximate to the vehicle.

10. The vehicle of claim 9, wherein:
the state of the vehicle is the static zone state;
the guidance information comprises a size and a location associated with a static zone; and
determining whether the guidance information complies with the state of the vehicle further comprises at least one of:
determining that the size of the static zone is less than or equal to a size threshold; or
determining that the location of the static zone is outside of a pre-set range or distance.

11. The vehicle of claim 9, wherein:
the state of the vehicle is the yield reclassification state;
the guidance information comprises driving at a speed and a steering angle; and
determining whether the guidance information complies with the state of the vehicle further comprises at least one of:
determining that the speed is greater than or equal to a speed threshold; or
determining that the steering angle is associated with a trajectory associated with a distance between the vehicle and an obstacle being below a threshold distance.

12. The vehicle of claim 6, wherein the configuration data defines a parameter, and authorizing the message further comprises:
determining, based at least in part on the guidance information being within a predetermined threshold of the parameter, that the guidance information complies with the configuration data.

13. The vehicle of claim 6, wherein the configuration data associated with maneuvering the vehicle comprises at least one of:
speed data of the vehicle;
size and shape data associated with a static zone;
curvature data between points associated with a trajectory;
spacing data between the points associated with the trajectory;
a maximum number of the points associated with the trajectory; or
geofence data.

14. One or more non-transitory computer-readable media storing instructions that, when executed, cause one or more processors to perform operations comprising:
receiving information associated with a computing device;
receiving a message from the computing device comprising guidance information associated with a vehicle;
authorizing the message from the computing device to control the vehicle based at least in part on at least one of configuration data associated with maneuvering the vehicle or state information associated with the vehicle, wherein authorizing the message is performed at the vehicle and comprises determining that the message complies with at least one of the configuration data or the state information; and
controlling the vehicle based at least in part on authorizing the message.

15. The one or more non-transitory computer-readable media of claim 14, wherein the state information comprises at least one of location data, pose data, or velocity data associated with the vehicle.

16. The one or more non-transitory computer-readable media of claim 14, wherein authorizing the message further comprises:
determining, based at least in part on sensor data, a state of the vehicle; and
determining that the guidance information complies with the state of the vehicle.

17. The one or more non-transitory computer-readable media of claim 14, further comprising:
determining, based at least in part on sensor data, a state of the vehicle, and wherein the state of the vehicle comprises at least one of:
a path building state,
a static zone state,
a yield reclassification state, a location of the vehicle,
map data,
a speed of the vehicle,
a pose of the vehicle,
an occupancy of the vehicle, or
an object proximate to the vehicle.

18. The one or more non-transitory computer-readable media of claim 17, wherein:
the state of the vehicle is the yield reclassification state;
the guidance information comprises driving at a speed and a steering angle; and
determining whether the guidance information complies with the state of the vehicle further comprises at least one of:
determining that the speed is greater than or equal to a speed threshold; or
determining that the steering angle is associated with a trajectory associated with a distance between the vehicle and an obstacle being below a threshold distance.

19. The one or more non-transitory computer-readable media of claim 14, wherein the configuration data defines a parameter, and wherein authorizing the message further comprises:
determining, based at least in part on the guidance information being within a predetermined threshold of the parameter, that the guidance information complies with the configuration data.

20. The one or more non-transitory computer-readable media of claim 14, wherein the configuration data associated with maneuvering the vehicle comprises at least one of:
speed data of the vehicle;
size and shape data associated with a static zone;
curvature data between points associated with a trajectory;
spacing data between the points associated with the trajectory;
a maximum number of the points associated with the trajectory; or
geofence data.

\* \* \* \* \*